United States Patent [19]
Delakowitz et al.

[11] Patent Number: 5,422,946
[45] Date of Patent: Jun. 6, 1995

[54] MAIN DISTRIBUTION DEVICE FOR TELEPHONE AND DATA LINES

[75] Inventors: Bernd Delakowitz; Claus Sander; Gunter Hegner, all of Berlin, Germany

[73] Assignee: Krone Aktiengesellschaft, Berlin-Zehlendorf, Germany

[21] Appl. No.: 193,941

[22] Filed: Feb. 9, 1994

[30] Foreign Application Priority Data

Feb. 19, 1993 [DE] Germany ............. 93 02 456 U

[51] Int. Cl.⁶ ............................................. H04M 7/14
[52] U.S. Cl. .................................... 379/327; 379/329; 361/827; 361/829
[58] Field of Search ............... 361/601, 622, 729, 826, 361/829, 827; 379/327, 328, 329, 330, 331, 332

[56] References Cited

U.S. PATENT DOCUMENTS

| | | | |
|---|---|---|---|
| 4,171,857 | 10/1979 | Forberg et al. | 339/97 P |
| 4,747,020 | 5/1988 | Brickley et al. | 379/327 |
| 5,299,098 | 3/1994 | Schüssler et al. | 361/829 |

*Primary Examiner*—James L. Dwyer
*Assistant Examiner*—Scott Wolinsky
*Attorney, Agent, or Firm*—McGlew and Tuttle

[57] ABSTRACT

A distribution device, in particular for the main distribution of telephone and data lines, includes a distribution rack, a distribution frame, and a pivotable frame, for terminating the system side and the subscriber side. Jumper possibilities and the adaptation to the possibilities of computer-controlled exchange systems are improved by disposing the subscriber side and the system side-by-side in a modular manner on a profile frame, and building them up vertically above each other to frame rows disposed side-by-side.

13 Claims, 4 Drawing Sheets

MAIN DISTRIBUTION DEVICE FOR TELEPHONE AND DATA LINES

FIELD OF THE INVENTION

The present invention relates to a distribution device, in particular for the main distribution of telephone and data lines.

BACKGROUND OF THE INVENTION

A main distribution device, in particular of telephone lines, connects the system cables or the exchange side, resp., and the local cables or the subscriber side, resp. In the main distribution device, separating and testing means as well as possibilities for protecting the line paths and for jumper options have to be provided. The organization of the main distribution device is determined by these requirements. It is desirable and often necessary to keep the jumper possibility for all terminals as short as possible, in order to optimize the transmission properties and service friendliness.

The prior art conventional main distribution devices are horizontally and vertically organized main distribution devices. This is based on the horizontal cable layout on the system side (exchange side) and the vertical cable layout on the network side (subscriber side).

From CH patent specification 623,698, a distribution device is known in the art, wherein the distribution frame consists of two base portions formed of U-section carriers, several bearing blocks being attached at the base portions, pivoting frames provided with termination modules being pivotably supported thereat with their one-side pivot axis. Pivotability of the pivoting frames is intended for permitting a good accessibility to the cable channels disposed behind the flapped-in pivoting frames, and termination of cable wires to the termination modules disposed in the pivoting frames. The provided cable channels between and besides the pivoting frames, and the pivoting frames being disposed at an angle of 60° to 120° in the rest position cause a large space consumption. The cable channels are, even with swung-out pivoting frames, not accessible in an optimum manner for wiring jobs. Wiring cable wires to the termination module section located close to the pivot axis is only poorly possible, even with the pivoting frame swung-out. This is even more so since this termination module section is close to an adjacent section of the base portion, and is not freely accessible. The jumper paths between the distribution rails are relatively long, in particular in that on one frame, the modules for one cable side only are provided, so that jumper actions have to be performed between two frames.

SUMMARY AND OBJECTS OF THE INVENTION

It is therefore an object of the present invention to develop a distribution device of the type referred to hereinbefore, wherein jumper possibilities and adaptation to the possibilities of computer-controlled exchange systems are improved, and wherein thereby the organization of a main distribution device is optimized.

According to the invention, a distribution device is provided which is the main distribution device for telephone and data lines. The device includes a distribution rack, a distribution frame, a pivotable frame for terminating the system side and the subscriber side. The subscriber side and the system side are disposed side-by-side in a modular manner on a profile frame. The subscriber side and the system side are built up vertically above each other to frame rows disposed side-by-side.

The main distribution device obtains a new organization by that the subscriber side and the system side are disposed side-by-side in modular manner, i.e. the horizontal-vertical layout is eliminated. On one frame, there are in the same row the modules for the subscriber cables and for system cables, so that vertical rows on one frame are formed adjacently for all subscriber terminals. Thereby, the shortest jumper paths are allowed. In computer-controlled distribution systems, benefit is drawn from the possibility to connect between the subscriber and an arbitrary free port of the system. The free port that is closest is selected. Thereby, shorter jumper paths and improved transmission properties are realized. The main distribution device provides the jumper possibilities for all terminations. The concept of the distribution device permits with a minimum of manual action the erection of distribution frame rows. The elimination of jumper spaces and the better organization of the cable paths in conjunction with the pivotable profile frames lead to a closer layout of the distribution frame rows and thus to a higher subscriber density (space saving). All tasks can be performed from one side by one person. By the shorter jumper paths, lower crosstalk interferences and attenuations and higher transmission bit rates are achieved. Benefit is drawn from the insulation displacement technique.

The profile frames are formed of two perforated plates connected to each other by parallel round-section bars and are supported at supports of the distribution frame. The width of the profile frame is preferably substantially determined by the distance of the round-section bars from each other and is defined by the length of the employed terminal blocks of an insulation displacement element, the terminal blocks being latched on the round-section bars. The profile frames are preferably pivotably mounted towards the front.

At supports, an upper hinge and a lower hinge are mounted, which are in engagement with locking bars. The locking bars have bolts on upper perforated and lower perforated plates. The profile frame is pivotably suspended by the upper hinge and the lower hinge.

The profile frames are preferably provided with a locking device. A clamping lever is preferably connected with a locking bar forming the locking device. The profile frames disposed above each other are connected with a coupling device. The supports are preferably formed by Z-plates. Cable holders of angular pieces and/or U-shaped receiving portions and of spring-elastic clips are provided. Erection of the device is possible in a free space or also at a wall.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
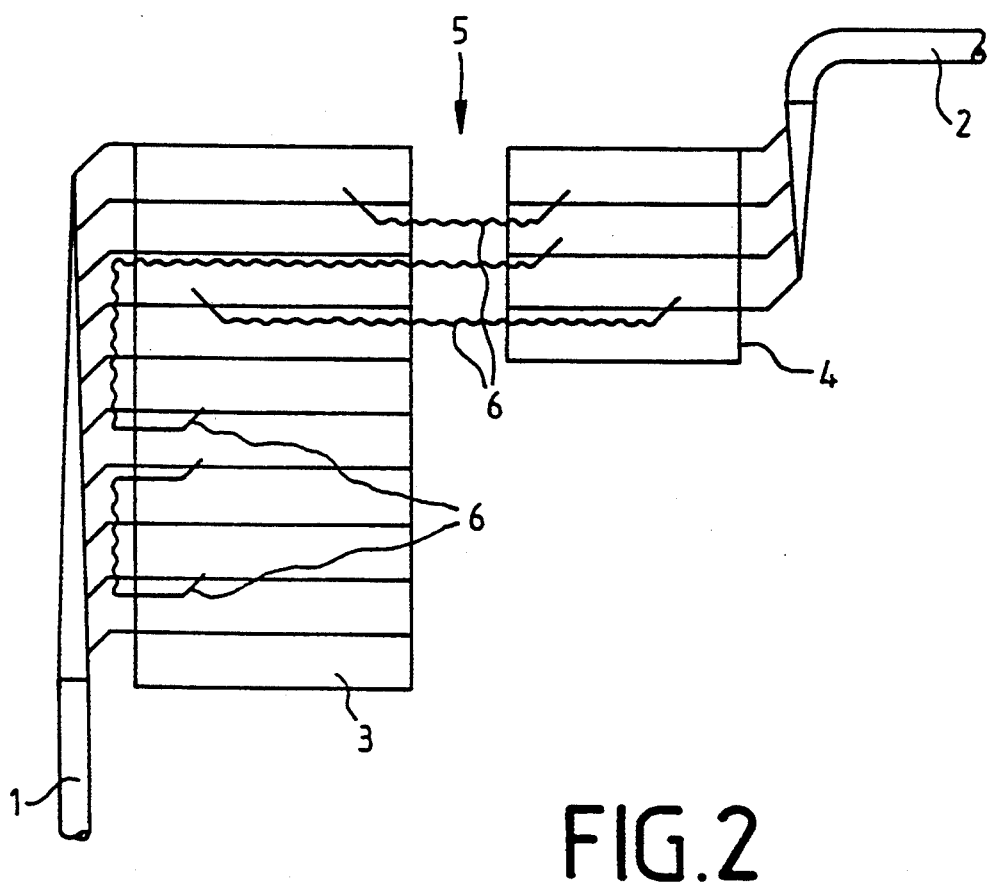
FIG. 1 is a schematic representation of the cable layout for the subscriber and system sides.
Figure 2:
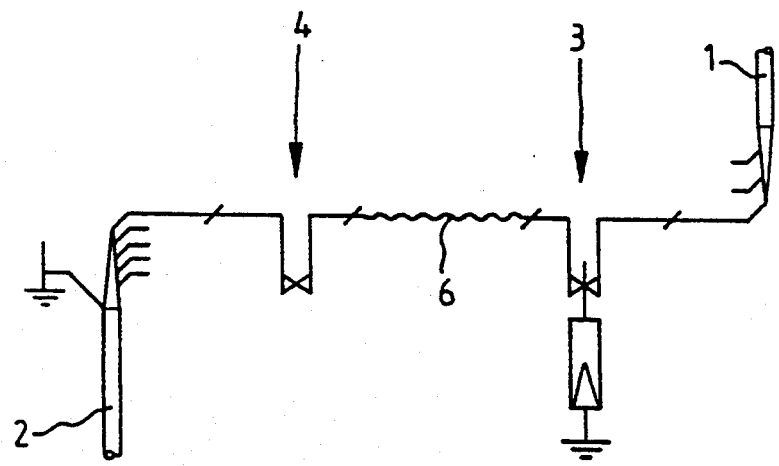
FIG. 2 is a schematic representation of the current path between the subscriber and system sides.

FIG. 1 shows, in a schematic representation, the organization principle for the distribution device, as it is given by the shown manner of approaching a subscriber cable 1 and a system cable 2 to the modules 3, 4 of a main distribution device 5 and by the connection of the modules 3, 4 to each other over jumper lines 6. The system cable 2 is connected to a not shown terminal for assigning subscriber numbers. The system cable 2 is positioned in a location approaching the modules 4. The modules 4 are composed, e.g., of terminal blocks (not shown) which are of the insulation displacement technique type (with insulation displacement terminals) and have contact elements for testing, separating and connecting. Over these contact elements and jumper lines 6, a desired connection to an adjacent module 3 on the subscriber cable side is established. The respective module 3 on the subscriber cable side is also composed, e.g., of terminal blocks (not shown) also of the insulation displacement technique type with contact elements for the connection, for the protection from overvoltages or overcurrents, for earthing and for the termination of the subscriber cable 1. The diagrammatical equivalent circuit of the current path of a line connection between the system cable 2 and the subscriber cable 1 is shown in FIG. 2. Digital, decade as well as PCM systems can be connected.

Figure 3:
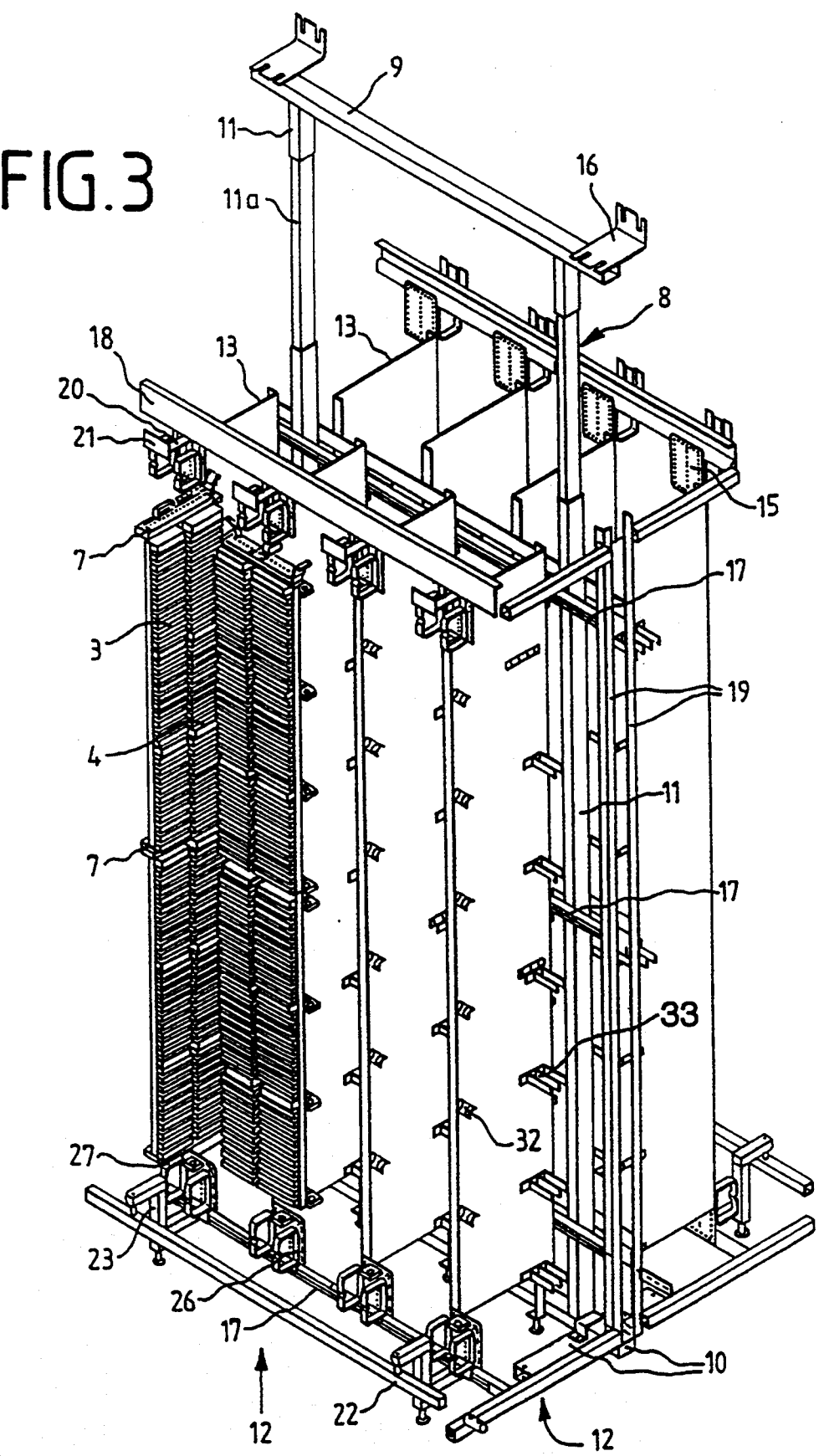
FIG. 3 is a schematic front view of a distribution device.

FIG. 3, in a perspective front view, shows the construction of a distribution device, wherein swing-out profile frames 7 are disposed into which are latched the modules 3, 4.

The distribution device comprises a frame 8 which is formed of head rails 9, foot rails 10 and supports 11. This frame 8 permits the construction of distribution frame rows 12, independently from walls. Even possibly existing columns can be integrated without problems in the distribution frame rows 12. The elimination of jumper spaces, as can be seen from FIGS. 1 and 2, and the better organization of the cable paths, in conjunction with the pivotable profile frames 7, lead to a tighter layout of the distribution frame rows 12 and thus to a higher subscriber density, i.e. more subscribers can be connected per space unit. The frame 8 is preferably composed of rectangular profile tubes. To the frame 8 are screwed on Z-plates 13 connected to mounting plates 15 and cable holders 32 to 36. At the Z-plates 13 are disposed the pivotably supported profile frames 7 intended for the reception of the modules 3, 4.

Figure 4:
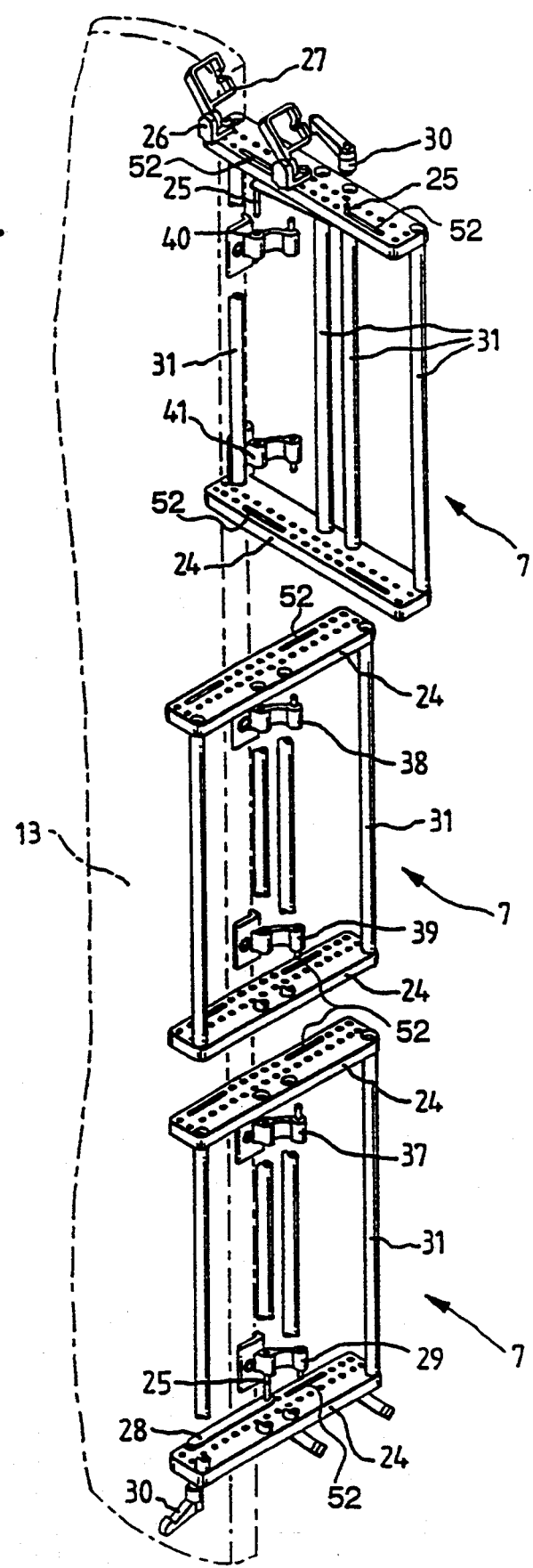
FIG. 4 is a perspective view of three pivotable profile frames disposed at a Z-plate.

In the following, the fundamental steps of the assembly sequence of a distribution device with the essential components is described under reference to FIG. 3 and 4. It is distinguished, in the assembly, between three variants of racks, "racks attached at a wall and having a frame"
"racks attached at a wall and not having a frame"
"free-standing racks having a frame"

In the following, only the free-standing rack variant having a frame shown in FIG. 3 will be described, the rack being designed for a two-sides distribution device.

The foot rails 10 are aligned and are connected to each other. The support 11 is screwed on at the foot rail 10. For level compensation of the cover (not shown), compensation supports 11a are employed, which are included in telescopic manner in the supports 11 and are screwed on, together with the supports, at the head rail 9. The head rail 9 is attached at the cover, by angular pieces 16. At the supports 11, an upper, a middle and a lower C-rail 17 are screwed on. At the C-rails 17 there are rigidly screwed on the pre-assembled Z-plates 13 (pre-assembled with not shown hold and attachment elements). The upper and the lower C-rails 17 are rigidly screwed on at the support 11. The front C-rails 17 are screwed on at the top and at the bottom with mounting plates 15 on the Z-plates 13. At the upper front C-rail 17 (not visible) is screwed on a panel 18. At the ends of the distribution frame, end rails 19 are screwed on at the rear top, center and bottom. Onto the upper jumper angle 20 attached at the mounting plate 15, is fixed a sign 21 for labelling the row. Protective tubes 22 are supported by intermediate supports 23.

Into this distribution frame, the pivotable profile frames 7 are inserted according to the representations of FIG. 4, as follows:

Generally three profile flames 7 are mounted pivotably from bottom to top. At the lower profile frame 7, one of two long threaded bolts 25 of a locking bar 28, is rotatably fastened at a hinge 29 at the bottom via a slot 52. An upper hinge 37 is screwed on at the Z-plate 13, and the profile frame 7 is pivotably suspended by the upper hinge 37 at the top via a slot 52. The pre-assembled lower hinge 29 is pivotably inserted, with the locking bar 28, into the profile frame 7. The lower hinge 29 is screwed on at the Z-plate 13. The clamping lever 30 is movably screwed on the other long threaded bolt 25 of the locking bar 28. The clamping lever 30 is tightened and loosened for unlocking and locking the profile frame 7.

The central profile frame 7 is mounted as follows. The upper hinge 38 is screwed on at the Z-plate 13. The profile frame 7 is pivotably suspended by the upper hinge 38 via slot 52. Similarly the lower hinge 39 is also pivotably inserted into a slot 52 of the profile frame 7. The lower hinge 39 is screwed on at the Z-plate 13.

The upper profile frame 7 is mounted by pivotably attaching one of the long threaded bolts 25 of the locking bar 28 at the upper hinge 40 via a slot 52. The pre-assembled upper hinge 40 is screwed on, with the locking bar 28, at the Z-plate 13. The profile frame 7 is pivotably suspended in the upper hinge 40 via slot 52. The lower hinge 41 is pivotably inserted into the profile frame 7 via slot 52. The lower hinge 41 is screwed on at the Z-plate 13. The clamping lever 30 is movably screwed on the other long threaded bolt 25 of the locking bar 28. The clamping lever 30 is tightened and loosened for locking and unlocking the profile frame 7. At the upper profile frame 7, at the top, a latch holding angle 26 is screwed on, and a jumper eye 27 is latched onto the latch holding angle 26, in a 45° position.

The profile frames 7 are in total formed by two perforated plates 24 each, which are rigidly connected to each other by four round-section bars 31 each. The distances of the respectively outside round-section bars 31 to the respectively inside round-section bars 31 correspond to the length of the not shown terminal blocks of the insulation displacement technique type, which are latched onto the round-section bars 31. The terminal blocks of the insulation displacement technique type form the modules 3, 4 for the reception of the subscriber cables 1 and the system cables 2, according to the representation in FIGS. 1 to 3. The profile frame 7 has a width substantially determined by a spacing of the round-section bars 31 from each other and having a length defined by terminal blocks of said subscriber modules and system modules. The terminal blocks have insulation displacement terminals. The terminal blocks are latched on said round-section bars.

Figure 5:
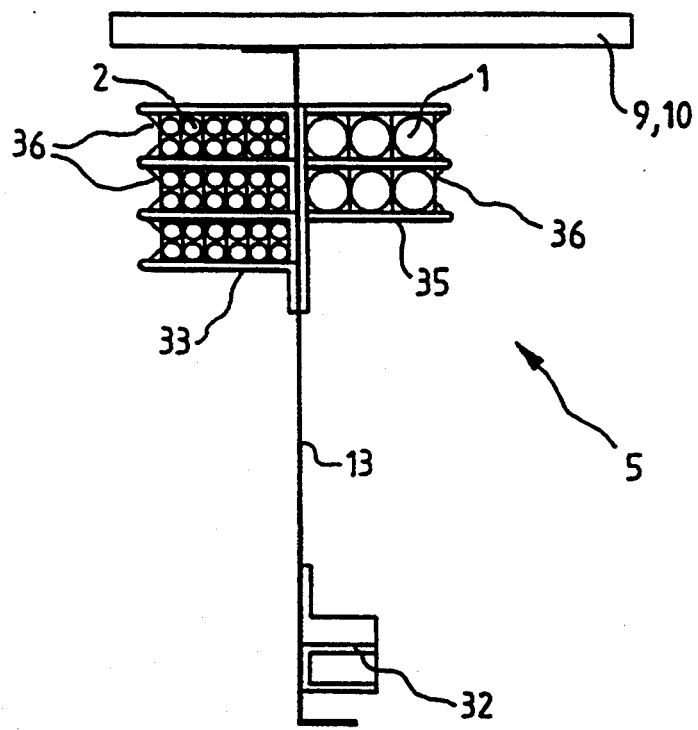
FIG. 5 is a schematic representation of the cable layout in the main distribution device (top view).

In FIG. 5 is schematically shown the cable layout for the subscriber cable 1 and for the system cable 2 in the main distribution device 5 which may be connected to a distribution frame including head rail 9 and foot rail 10. The employed cable quick-mount system permits simple insertion of the cables 1, 2, in the order of sections. The subscriber cables 1 are generally inserted on the right-hand side of the Z-plate 13 into the U-shaped receiving portions 35, and fill these receiving portions 35 up in the rear part, beginning with the subscriber cables 1 for the upper profile frame 7 (FIGS. 3 and 4). The system cables 2 are inserted on the left-hand side of the Z-plate 13 into the angular pieces 33. The rear parts of the angular pieces 33 are filled up, beginning with the system cables 2 for the lower profile frames 7 (FIGS. 3 and 4). The cables 1, 2 are fixed by clips 36. The clips 36 are made of spring-elastic material, and can easily be removed, in order, e.g. to add cables. The cable holders 32 serve for holding the cables 1 when approaching these. A time-consuming binding of the cables 1, 2 is prevented; instead a short assembly time of the distribution device 5 is achieved.

While a specific embodiment of the invention has been shown and described in detail to illustrate the application of the principles of the invention, it will be understood that the invention may be embodied otherwise without departing from such principles.

What is claimed is:

1. A distribution device particularly for telephone and data lines, comprising:
    a distribution frame;
    a distribution rack supported by said frame; and
    a profile frame pivotably connected to said distribution frame, said profile frame having subscriber side and system side modules disposed side-by-side on a front side of said profile frame, said modules being built-up vertically above each other to form frame rows, said frame rows being disposed side-by-side, said modules being positioned to have a common wire insertion side.

2. A distribution device according to claim 1, wherein said profile frame is comprised of two perforated plates connected to each other by parallel round-section bars, said profile frame being connected to a support of said distribution frame.

3. A distribution device according to claim 2, wherein an upper hinge and a lower hinge are mounted to said support of said distribution frame, a locking bar being provided in engagement with said upper or lower hinge, said locking bar having a blot through said upper or lower perforated plate, said upper and lower hinge pivotably suspending said profile frame.

4. A distribution device according to claim 3, wherein a clamping lever is provided connected to said locking bar bolt.

5. A distribution device according to claim 1, wherein said profile frame is pivotably mounted towards the front of said distribution frame.

6. A distribution device according to claim 1, wherein said profile frame is provided with a locking device.

7. A distribution device according to claim 1, wherein said distribution frame being supported free-standing, in a free space or at a wall.

8. A distribution device according to claim 2, wherein said support comprises a Z-plate.

9. A distribution device according to claim 2, wherein cable holders are connected to said support, said cable holders being one of angular pieces, U-shaped receiving portions and spring-elastic clips.

10. A distribution device for telephone and data lines, comprising: a distribution rack;
    a profile frame including a plurality of section bars and upper and lower profile frame plates, said section bars extending between said upper and lower profile frame plates;
    pivot means connected to said upper and lower profile frame plates for pivoting said profile frame with respect to said distribution rack;
    a plurality of insulation displacement contact modules for terminating wires including a plurality of subscriber insulation displacement contact modules and a plurality of system insulation displacement contact modules, said subscriber insulation displacement contact modules being connected to said section bars to provide a plurality of subscriber side insulation displacement contact modules with contact positions facing the front, extending vertically and said system side insulation displacement contact modules being connected to said section bars to provide a plurality of system side insulation displacement contact modules with contact positions facing the front, extending vertically, disposed in side-by-side relationship with respect to said subscriber side insulation displacement contact modules.

11. A distribution device according to claim 10, wherein said pivot means includes an upper and lower hinge, a locking bar is provided connected to one of said upper and lower hinges for fixing said profile frame in an initial position with respect to said distribution rack, said locking bar is connected at one end to one of said upper and lower hinges and connected at the other end to said profile frame via a clamping lever for tightening and loosening said locking bar.

12. A distribution device according to claim 10, wherein a plurality of profile frames are provided, positioned one above another and positioned adjacent to one another in a side-by-side relationship.

13. A distribution device according to claim 12, wherein said distribution frame includes a plurality of support plates, said support plates being connected to said pivot means for supporting said plurality of profile frames.

* * * * *